United States Patent [19]

Pcolinsky, Jr.

[11] Patent Number: 4,605,684

[45] Date of Patent: Aug. 12, 1986

[54] ANTISTATIC POLYURETHANE FOAM

[76] Inventor: Michael P. Pcolinsky, Jr., 1009 Meade Ct., Hazleton, Pa. 18201

[21] Appl. No.: 793,163

[22] Filed: Oct. 31, 1985

[51] Int. Cl.$^4$ ............................................... C08J 9/00
[52] U.S. Cl. ..................................... 521/107; 521/121
[58] Field of Search ............................... 521/107, 121

[56] References Cited

U.S. PATENT DOCUMENTS 4,169,922  10/1979  Brown ................................. 521/107

*Primary Examiner*—Morton Foelak

[57] ABSTRACT

Flexible polyurethane foams having improved electrostatic properties are provided by incorporating into the reaction mixture before foaming an antistatic additive composition comprising a blend of a quaternary ammonium compound selected from the group consisting of soya dimethyl ethyl ammonium ethylsulfate, soya dimethyl ethyl ammonium phosphate, and mixtures thereof, and a plasticizer composition selected from the group consisting of N-ethyl-o- and p-toluene sulfonamide, o- and p-toluene sulfonamide, and tetrakis (2 chloroethyl) ethylene diphosphate, and mixtures thereof.

9 Claims, No Drawings

ANTISTATIC POLYURETHANE FOAM

This invention relates to flexible polyurethane foams exhibiting enhanced antistatic properties, that is, foams which rapidly dissipate electrostatic charges and exhibit a reduced tendency to accumulate electrostatic charges. The flexible polyurethane foams can be produced by reactions of isocyanates with polyester polyols, polyether polyols, mixtures of polyether and polyester polyols, or with mixtures of polyether polyols and copolymer polyols, such as a grafted polyether containing styrene and acrylonitrile.

BACKGROUND OF THE INVENTION

Polyurethane foams, like almost all other synthetic polymeric materials, tend to acquire and accumulate electrostatic charges. For many applications it is desirable, if not essential, to have a foam material which either does not acquire an electrostatic charge, or which dissipates it rapidly.

Accumulation of electrostatic changes on all types of polymeric materials has been a long-standing problem, and a variety of techniques have been proposed to alleviate the problem. For example, additives which migrate to the surface of the plastic or fiber have been incorporated in the composition to modify its electrical properties. Antistatic resins have been copolymerized with the base polymer in an effort to provide improved properties. Quaternary ammonium salts have been applied topically, i.e., by impregnation, or incorporated directly into the polymeric materials to provide a finished, or semi-finished product with improved antistatic properties. For example, U.S. Pat. No. 3,117,113 with a priority filing date in 1957, discloses the use, in combination with PVC, of quaternary ammonium compounds of the general class found useful in this invention. U.S. Pat. Nos. 3,335,123 and 3,407,187 disclose the use of quaternary ammonium compounds which are physically incorporated into polyolefins, PVC and other polymers, as by milling. None of these patents suggests the introduction of the quaternary ammonium compounds into the reaction mixture prior to polymer formation.

Polyurethane foam can be provided with antistatic properties by one of two methods: (1) the in-situ production of an antistatic foam that has uniform properties throughout its volume and cross-section; and (2) a post-treatment method in which an antistatic composition is impregnated on the surface and, to the extent possible, throughout the interior structure of the foam product. The latter technique is the less preferable since it requires repeated handling and treatment of material thereby increasing its cost; it provides less uniform properties, which properties may indeed be only superficial if the thickness of the foam material is substantial; and the impregnant is subject to removal by wear and tear if the impregnated product is used over again. If used for packing sensitive electronic components, such as computer chips, the impregnated composition may attach to, and damage the article. Of course, in some applications such as laundry softeners or antistatic agents, it is intended that the impregnated foam lose its antistatic coating as it is transferred to the damp laundry during use in the dryer. However, in most applications it is desirable for the foam product to exhibit both permanent and uniform antistatic properties which will render the product electrostatic free. The characteristics of packaging materials used for a variety of sensitive electronic components and devices are set forth in the military specification Mil. No. B 81705B.

It is known that certain quaternary ammonium salts can be added during the manufacture of polyurethane foam to impart improved antistatic properties to the cured foam. U.S. Pat. No. 3,933,697 discloses specific quaternary ammonium salts that can be incorporated as an ingredient into the composition prior to commencement of the foam-forming reaction; alternatively, it is suggested that the same compounds can be applied by impregnation to the finished urethane foam.

While the advantages of incorporating an additive by the in-situ method which will render the finished product antistatic are obvious, the selection of appropriate materials must be based upon their compatibility in the foam making process, and on their effect on the physical appearance and characteristics of finished foam product. This is so because the foam-forming reaction requires a careful balancing of the polymerization, or gellation, reaction with the expansion of the foam-forming ingredients to provide a uniform cell structure, the avoidance of splits, cracks and other defects, and finally the polymerization which must be completed within a critical time period to insure a self-sustaining and stable foam structure. The presence of even small quantities of additional compounds can have a markedly adverse effect on the reaction mechanism and the finished product. Those familiar with the art will know of the adverse effects of low levels of contaminants or impurities which may be barely detectable.

It is therefore essential in seeking an agent or additive which will render the finished foam antistatic, to find a compound or composition that is totally compatible with the foam making process. Other factors which must be taken into account are (1) the ability to mechanically incorporate the antistatic additive into the foam-forming composition using conventional equipment; and (2) the cost of the additive at its effective level or within its effective range and its impact on the final cost of the foam.

SUMMARY OF THE INVENTION

It has now been found that certain quaternary ammonium compounds, when combined with plasticizers, and preferably those plasticizers which are liquids, form a solution which can be incorporated into the polyurethane foam making composition to provide remarkably improved antistatic properties in the finished foam product.

The quaternary ammonium compounds found to produce a synergistic result in the practice of this invention are commercial products.

One of the quaternary ammonium compounds found to be useful in the practice of the invention is soya dimethyl ethyl ammonium ethylsulfate, and specifically the product sold under the trademark Larostat 264-A by Jordan Chemical Company of Folcroft, Pa. The product is a waxy solid which can be converted to a pourable liquid by heating to 50° C.–65° C. Jordan Chemical markets this product in the form of a liquid blend of the quaternary ammonium compound in twenty percent dipropylene glycol (DPG) as Larostat 377, and it can also be used in the practice of the invention. Another quaternary ammonium compound found to be useful in the practice of the invention is soya dimethyl ethyl ammonium ethylphosphate, and specifically the product sold under the trademark Larostat 192 by Jordan Chemical. This product is a pourable liquid which can be mixed with the other components to produce the antistatic additive composition which are incorporated into the foam-forming mixture. The preferred quaternary ammonium compound is the soya dimethyl ethyl ammonium ethylsulfate of Larostat 264-A.

The plasticizers of this invention found to provide the markedly improved antistatic properties when used in combination with the above quaternary ammonium compounds are also commercially available products.

The plasticizer compositions found to be useful in the practice of this invention are as follows: the mixture of N-ethyl-o- and p-toluene sulfonamide, sold by Monsanto Chemicals under the trademark Santicizer 8; the mixture of o- and p-toluene sulfonamide, sold by Monsanto Chemicals under the trademark Santicizer 9; and tetrakis(2 chloroethyl) ethylene diphosphate sold by Olin Chemical Company under the trademark Thermolin 101. Santicizer 8 is the preferred plasticizer compound and is a light yellow, viscous liquid, which is a mixture of the ortho and para isomers. Santicizer 9 is a white to light-cream granular solid, also a mixture of the ortho and para isomers. The Thermolin 101 product is a liquid, and has utility as both a plasticizer and a flame retardant.

In the examples which follow, the various quaternary ammonium compounds and plasticizers which were used are, for convenience, identified by their commercial names, or abbreviations.

Most significant is the discovery that quaternary ammonium compounds, which are solids at ambient temperature and pressure, when dissolved with plasticizers to provide an antistatic additive composition, exhibit a synergistic effect when added to the foam-forming reactants and provide a finished foam having greatly improved antistatic properties. This synergism is demonstrated by the fact that when only the quaternary ammonium compounds alone, or the plasticizers of the invention are added to the foam-forming mixture no significant improvement of antistatic properties in the finished foam are observed. Polyurethane foams made with one or the other of the compounds exhibit essentially the same antistatic properties as foam containing no antistatic additives.

The preferred combination of quaternary ammonium salts and plasticizers of this invention provide a stable solution, that is, one which does not separate on standing, solidify on cooling or produce a precipitate. The stability of the antistatic additive solution is extremely important from the standpoint of commercial production. Polyurethane foams are made by continuous casting methods which are capable of, and are most efficient when they are run for several hours, or throughout an entire shift. Additive streams must be fed from storage vessels to the mixing head throughout this period. Such additives must be stable over the daily production period, and preferably should be stable over periods of at least several days. The preferred antistatic additive solutions of this invention meet those criteria.

The antistatic additive solutions of this invention are prepared by mixing one part by weight of the quaternary ammonium compound in from about 0.4 part to three parts of liquid or solid plasticizer. Significantly enhanced antistatic properties have been obtained when the antistatic additive composition is comprised of one part of quaternary ammonium compound and one and one-half parts of plasticizer.

In a preferred embodiment of the invention the quaternary ammonium composition of Larostat 264-A, which is a waxy solid at room temperature, is heated to between about 50° C. and 65° C., and when it melts and is flowable, is poured into the liquid plasticizer, which is preferably the N-ethyl-o- and p-toluene sulfonamide mixture of Santicizer 8. This mixture is then drum rolled or mixed with an impeller for a short time to obtain a clear homogeneous solution. This mixture is stable and no phase separation is observed at high or low temperatures.

The quaternary ammonium composition of Larostat 264-A can also be blended into other plasticizers or into polyols using the same general procedure. In some instances, some phase separation may be observed as the mixture cools. Any phase separation which does occur can be minimized, if not eliminated entirely, by maintaining the mixture at a higher than normal temperature. As will be apparent to one skilled in the art, adjustments to the foam formulation can be made to take account of the higher temperature of the foam forming composition and reaction.

As noted above, the antistatic additive composition of this invention is added to the foam-forming reactants at the time of mixing. It can be combined in a prepolymer mix, or added as a separate metered stream in accordance with techniques well-known to those familiar with the art. Noticeable improvements have been observed with the incorporation of from about 5 to about 25 parts of antistatic additive solution per 100 parts of polyol or resin. The term resin as used here is synonymous with polyol and includes polyester and polyether polyols, and mixtures thereof. The term "phr" means "parts per hundred of resin." The preferred level of antistatic additive solution is from about 17 to 22 parts per 100 parts of polyol.

The polyurethane foams of this invention can be manufactured by the one-shot or prepolymer methods, and can consist of polyester polyols, polyether polyols, or polyurethanes prepared from a blend of polyester and polyether polyols, and of blends of polyether and copolymer polyols, all of which are described in more detail below.

Polyurethane foams exhibiting improved antistatic properties have many applications including use in operating rooms where sparks can present a serious fire hazard; in connection with sound proofing and vibration damping materials for computers; and in the packaging and handling of sensitive electronic components such as computer chips where the presence of static electricity can modify or damage the article so that it cannot be used.

In the examples which follow the polyether polyol resin used had an average molecular weight of 3500, unless otherwise indicated. The copolymer polyol was a grafted polyether polyol containing copolymerized styrene and acrylonitrile, which was supplied by Dow Chemical U.S.A. under the designation XAS-10963.01. Other copolymer polyols which can be used in this invention are available from Union Carbide Corp. and from BASF Wyandotte.

The polyester resin has an average molecular weight of 2000.

The isocyanate used was tolylene diisocyanate, (also referred to as toluene diisocyanate, or simply TDI) which was an isomeric mixture of the 2,4 isomer (67%) and the 2,6 isomer (33%.) In some instances the isomeric mixture of the TDI was 80/20, respectively. Unless otherwise indicated, the TDI Index was 105. The utility of the invention is not limited to any particular isomeric ratio, or to any specific TDI Index value. Other isocyanates conventionally used in the manufacture of polyurethane foams can be used. These would include 4,4'-diphenylmethane diisocyanate (MDI), and others well-known to those familiar with the art.

DETAILED DESCRIPTION OF THE INVENTION

In the comparative the basic foam formulations are selected from those known in the art, and the individual components are commonly available and widely used. Similarly, in those examples which illustrate the claimed invention, apart from the novel combination of quaternary ammonium compounds and plasticizers which produce the improved electrostatic properties in the finished foams, the components and their relative proportions are assumed to be well within the skill of the art.

The following components used in the examples are identified as follows:

1. Amine catalysts—
   A-1, 70% bis(2 dimethyl aminoethyl) ether in DPG sold by Union Carbide Corp.
   A-30, silicone amine sold by Union Carbide
   33-LV, 33% triethylene diamine in DPG sold by Air Products Corp.
   NCM, N-coco morpholine sold by Lonza Chemical
   16-D, N-hexadecylmethyl amine sold by Lonza Chemical
   NEM, N-ethyl morpholine sold by Texaco
   M-6682, a mixture of fatty acid amides, sold by Witco Chemical
2. Organotin catalysts—
   C-4, 50% stannous octoate in DOP sold by Witco Chemical
3. Silicone surfactants:
   L-530, silicone copolymer sold by Union Carbide
   L-560, silicone glycol copolymer sold by Union Carbide
   L-5750, silicone glycol copolymer sold by Union Carbide
   DC-200, dimethyl polysiloxane from Dow Corning
4. Flame Retardant—
   DE-60F, pentabromo diphenyl oxide blended with 15% aromatic phosphate, sold by Great Lakes Chemical In the examples, the quantities of all of the components are expressed in terms of parts by weight of ingredients per 100 parts of resin, (i.e., polyol), or "phr."

In addition to the major ingredients which are indicated by their proportions in the following examples, the polyether foam formulations also included minor amounts of catalysts, stabilizers, accelerators, activators, surfactants, and other functional additives well known in the art. On average, the total of these other additives amounted to from about 2 to 3 parts by weight per 100 parts by weight of the polyol. In the examples which follow, unless otherwise specified, the components and ranges employed are:

TABLE I

| Silicone surfactant (L-5750) | 1.0–1.3 phr. |
| Organotin Catalyst (C-4) | 0.85–1.2 phr. |
| Amine Catalyst (A-1) | 0.30–0.375 phr. |
| Amine Catalyst (33-LV) | 0.10–0.125 phr. |

In the examples, the total quantity of these compounds is relatively small compared to the other ingredients. As is well known to those familiar with the art, their selection and the actual quantities employed are routinely varied in response to the ambient conditions of temperature and humidity, as well as the mechanical conditions relating to foam manufacture. In the interests of exemplifying the invention, the total quantity of these components identified in Table I appears in the Components column adjacent the entry "Catalyst, etc."

TEST METHOD

In determining the antistatic properties of the polyurethane foams described in the examples which follow, the static decay rate method as described in Federal Test Method Standard No. 101C-4046.1 was used. In general, this test method is used to determine the electrostatic properties of materials in film and sheet form by measuring the intensity and polarity of an induced charge and the time required for dissipation of the charge. In this test procedure, a static charge of 5000 volts is first applied across the foam sample and then the voltage source is removed and the sample is grounded. The foam sample and the test chamber are maintained at a relative humidity of about 15%. The time of static decay to zero volts is determined from a moving paper chart on which the drop in voltage is recorded. A value of less than 2 seconds for the decay time is established for the foam product in order to pass this test, and to insure that sensitive electronic components and like which are placed in contact with the foam will not be damaged.

A conventional flexible polyether polyurethane foam was prepared as a hand batch from a standard formulation using a polyol having an average molecular weight of 3000 and tolylene diisocyanate (80/20) with an Index of 115. When tested as described in FTMS No. 101C-4046.1, the cured sample maintained its initial 5 KV charge and no decay over time was observed. A conventional polyester polyurethane flexible foam was also prepared as a hand batch from a standard formulation using a polyester resin and tolylene diisocyanate (67/33). When tested as described above, the foam sample maintained the initial impressed charge of 5 KV with no observed decay over time.

PREFERRED EMBODIMENTS

The examples which follow illustrate the invention in various foam formulations.

EXAMPLE I (349-10-C)

| Component | Parts |
| --- | --- |
| Polyether | 100 |
| Tolylene diisocyanate (TDI) | 46.24 |
| Catalyst, etc. | 2.7 |
| Water | 3.5 |
| Antistatic Additive: | |
| 264-A | 8.0 |
| Santicizer 8 | 12.0 |

The above composition was prepared as a hand batch and a sample was cut from the cured foam for static decay testing in accordance with the method described above. The initial potential after the voltage source was removed was 5.0 KV and decayed to zero volts in 1.39 seconds.

EXAMPLES II THROUGH V

In each of these examples the polyol was a blend of the polyether resin used in Example I, and a copolymer polyol which incorporates styrene and acrylonitrile.

| | Parts | | | |
|---|---|---|---|---|
| Components | (349-9-A) Ex. II | (348-38-D) Ex. III | (349-6-A) Ex. IV | (349-6-C) Ex. V |
| Polyether | 70 | 70 | 70 | 70 |
| Copolymer polyol | 30 | 30 | 30 | 30 |
| TDI | 38.6 | 41.64 | 38.6 | 38.6 |
| Catalyst, etc. | 2.40 | 2.6 | 2.45 | 2.50 |
| Water | 3.1 | 3.1 | 3.5 | 3.5 |
| Antistatic Additive: | | | | |
| 264-A | 8.0 | 8.0 | 10.0 | 8 |
| Santicizer 8 | 12.0 | 12.0 | 15.0 | 12 |

Cured samples from each of these hand batches were tested as described above to determine the time for decay to zero volts with the following results:

| Example | Time (seconds) |
|---|---|
| II | 1.00 |
| III | 1.20 |
| IV | 0.88 |
| V | 0.94 |

EXAMPLE VI

In this example, a polyether polyol having an average molecular weight of 3000 was employed. A red color dispersion was added to impart a pink color to the foam.

| Components | Parts |
|---|---|
| Polyether | 100 |
| Tolylene diisocyanate | 44.78 |
| Catalyst, etc. | 2.3 |
| Water | 3.4 |
| Red color | .15 |
| Antistatic Additive: | |
| 264-A | 7.0 |
| Santicizer 8 | 10.5 |

A cured sample from the hand batch tested in accordance with the method described above decayed to zero volts in 1.36 seconds.

EXAMPLES VII AND VIII (349-43-C and 349-44-A)

In these examples a polyester polyol was employed and appropriate changes in the formulation were made.

| | Parts | |
|---|---|---|
| Components | (349-43-C) Ex. VIII | (349-44-A) Ex. IX |
| Polyester | 100 | 100 |
| TDI (80/20) - Index 102 | 44.1 | — |
| TDI (67/33) - Index 112 | — | 50.5 |
| Catalyst (C-4)* | 0.50 | 0.30 |
| L-532* | 1.3 | — |
| NEM/A-30 (.45/.20)* | .75 | — |
| DM16-D* | .15 | 0.10 |

-continued

| | Parts | |
|---|---|---|
| Components | (349-43-C) Ex. VIII | (349-44-A) Ex. IX |
| 33-LV* | — | .50 |
| M-6682* | — | 1.2 |
| NCM* | — | 1.0 |
| Antistatic Additive: | | |
| 264-A | 8.0 | 8.0 |
| Santicizer 8 | 12.0 | 12.0 |
| Water | 3.6 | 3.7 |

*[As previously defined]

Cured samples from these polyester foam hand batches were prepared and tested in accordance with the method described above. The decay times to zero volts were 0.86 seconds for the foam of Example VII and 0.56 seconds for the foam of Example VIII.

COMPARATIVE EXAMPLES A–E

In order to determine what effects, if any, each of the antistatic additives would have if used separately, two comparative examples were prepared using the polyether resin (3000 M.W.) and essentially the same basic formulation in Example VI with the following exceptions:

Comparative Example A contained 17.5 phr of the mixture of N-ethyl-o-and p-toluene sulfonamide, and no quaternary ammonium compound; and Comparative Example B contained 17.5 phr of soya dimethyl ethyl ammonium ethylsulfate, (Larostat 264-A), and no liquid plasticizer. Cured samples of foam prepared from these two hand batches were tested as described above. The samples carried a significant initial charge, and there was no observed decay of voltage with time from that as originally measured on these comparative samples. The results of the tests on the foam samples of Comparative Examples A and B establish a synergistic effect of the solution of the specific quaternary ammonium compound of Larostat 264-A and the Santicizer 8 plasticizer.

A third comparative example, Example C employing the polyether resin (average MW of 3500), and only Larostat 264-A was prepared as follows:

| Components | Parts |
|---|---|
| Polyether | 100 |
| TDI (80/20) | 43.6 |
| C-4* | .45 |
| A-1* | .19 |
| 33-LV* | .06 |
| Water | 3.5 |
| Larostat 264-A | 1.0 |

*[As previously defined]

A cured sample of this polyether foam of Example C was taken from the hand batch and tested in accordance with the method described above. The initial charge of 2.5 KV was not observed to decay over time.

Further comparative foams of Examples D and E were prepared to determine the effect of the separate addition of plasticizer and quaternary ammonium composition to a polyester polyurethane composition. These were prepared using the same foam formulation used in Example IX. In comparative Example D, only the plasticizer Santicizer 8 was used at a level of 20 phr. At this relatively high level, which is the maximum compatibility level recommended by the manufacturer for use with non-foam polyurethane polymer compositions, the cured sample exhibited a decay time of 5.34 seconds. Comparative Example E was prepared as a hand batch by heating the quaternary ammonium compound Larostat 264-A, adding it to the polyester polyol and then mixing it with the remaining components. The resin mixture was cloudy after addition of the quaternary ammonium compound and the resulting product collapsed, did not produce a foam, and was not tested.

EXAMPLES IX, X and XI (353-26-A; -B; -C)

In these three examples the TDI had an Index of 108 and a red pigment was added to provide the finished foam with a pink color.

|  | Parts | | |
| --- | --- | --- | --- |
| Components | (353-26-A) Ex. IX | (353-26-B) Ex. X | (353-26-C) Ex. XI |
| Polyether | 100 | 100 | 100 |
| TDI (67/33) | 44.78 | 44.78 | 44.78 |
| Catalyst, etc. | 2.45 | 2.45 | 2.30 |
| Water | 3.4 | 3.4 | 3.4 |
| Antistatic Additive: | | | |
| 264-A | 7.0 | — | — |
| 192 | — | 7.0 | 8.8 |
| Santicizer 8 | 10.5 | 10.5 | 13.2 |

Samples taken from the hand batches prepared from the above formulations were subjected to the static decay testing method previously described (1) on the day of their preparation, and (2) following aging of 20 minutes in an oven at 70° C., 30 minutes in a dessicator, and 24 hours in a temperature and humidity control chamber.

The decay times to zero volts were

|  | Ex. IX | Ex. X | Ex. XI |
| --- | --- | --- | --- |
| Initial | 0.46 | 0.92 | 0.42 |
| Aged | 0.61 | 1.58 | 0.63 |

EXAMPLE XII (353-10-"O")

In this example the polyether polyol has an Index of 108, and the plasticizer is a blend.

| Component | Parts |
| --- | --- |
| Polyether | 100 |
| TDI (67/33) | 44.78 |
| Catalyst, etc. | 2.30 |
| Water | 3.4 |
| Antistatic additive: | |
| 264-A | 7.0 |
| Santicizer-8 | 11.0 |
| Santicizer-9 | 2.0 |

A sample taken from the hand batch is tested for static decay as previously described. The time for decay to zero volts is 1.95 seconds.

EXAMPLE XIII (349-6-B)

The following example demonstrates that the antistatic additive is compatible with a liquid flame retardant compound sold for use with flexible polyurethane foams. The flame retardant identified as DE-60F is pentabromo diphenyl oxide blended with 15% of an aromatic phosphate sold by Great Lakes Chemicals.

| Components | Parts |
| --- | --- |
| Polyether polyol | 70 |
| Copolymer polyol | 30 |
| TDI (67/33) | 38.6 |
| Water | 3.5 |
| Catalyst, etc. | 2.45 |
| DE-60F | 5.0 |
| Antistatic Additive: | |
| 264-A | 6.0 |
| Santicizer 8 | 9.0 |

The above composition is prepared as a hand-batch and produces a satisfactory foam. After curing a sample is tested and found to have a static decay period of less than 2.0 seconds.

EXAMPLES XIV and XV (363-11-A and C)

In these exmples the urethane foam-forming reaction mixture comprises a blend of polyether and polyester polyols. The diisocyanate has an Index of 112.

|  | Parts | |
| --- | --- | --- |
| Components | (363-11-A) Ex. XIV | (363-11-C) Ex. XV |
| Polyester | 15 | 15 |
| Polyether | 85 | 85 |
| TDI (80/20) | 48 | 48 |
| C-4* | 3.5 | 3.5 |
| L-560* | 4.3 | 4.3 |
| DC-200* | — | .1 |
| A-1/33-LV (3/1)* | .35 | .35 |
| Red color | .20 | .20 |
| Antistatic Additive: | | |
| 264-A | 7.0 | 7.0 |
| Santicizer 8 | 10.5 | 10.5 |

*[As previously defined]

Samples taken from each of the hand batches were tested as previously described. The time to decay to zero volts for the foam of Example XIV is 1.67 seconds and for that of Example XV was 1.33 seconds.

EXAMPLES XVI AND XVII

In these examples a polyether polyurethane formulation essentially the same as that of Example VI was employed with the exception that the antistatic additive composition was a mixture of three parts of the liquid flame retardant-plasticizer tetrakis (2 chloroethyl) ethylene diphosphate to two parts of the quaternary ammonium composition of Larostat 264-A. The flame retardant-plasticizer is sold by Olin Chemicals under the trademark THERMOLIN® 101 and is identified as TM-101.

|  | Parts | |
| --- | --- | --- |
| Components | (363-10-B) Ex. XVI | (363-10-C) Ex. XVII |
| Polyether | 100 | 100 |
| TDI | 44.8 | 44.8 |
| Catalyst, etc. | 1.9 | 1.9 |
| Water | 3.4 | 3.4 |
| Red color | 0.2 | 0.2 |
| Antistatic additive: | | |
| TM-101 | 13.2 | 15 |
| 264-A | 8.8 | 10 |

Cured samples prepared from the hand batches were tested as described above. The decay time for Example XVI was 2.00 seconds and for Example XVII was 1.61 seconds.

ADDITIONAL COMPARATIVE EXAMPLES

Additional formulations were prepared using, the plasticizer Santicizer 8 with other quaternary ammonium compounds. These included solutions of 1.5 parts Santicizer 8 to 1 part Arquad RD6080 and Igepal 887. Arquad RD6080 is a proprietary quaternary ammonium compound sold by Akzo, and Igepal 887 is a 70% nonyl phenoxy polyethanol in water sold by GAF. Solutions of these additives were incorporated at levels ranging from 7 phr to 17.5 phr of polyether resin in hand batches. Samples cut from the cured foam and subjected to static decay testing showed no appreciable loss of accumulated static charge over time.

Another series of tests were conducted to determine whether other known plasticizers could be used with the preferred quaternary ammonium compound Larostat 264-A to produce an effective antistatic additive composition. Solutions of 1 part Larostat 264-A to one and one-half parts of each of the following compounds were prepared: (1) benzyl phthalate; (2) dioctylphthalate, or DOP; and (3) cresyl diphenyl phosphate, or CDP. These solutions were added at a level of 17.5 phr in a formulation similar to that of Example IX. Hand batches were prepared and cured. Samples tested showed no observable decay in static charge for examples using benzyl phthalate or DOP; the sample containing CDP showed a decay rate of approximately 6.7 seconds.

While certain representative embodiments and details have been shown for the purpose of illustration, numerous modifications to the foam formulations previously described can be made without departing from the invention disclosed.

What is claimed is:

1. In the method of preparing a flexible polyurethane foam from a polyol and a polyisocyanate the improvement which comprises adding to the foam-forming composition from about five to about 25 parts by weight per 100 parts by weight of polyol of an antistatic additive composition comprising one part by weight of a quaternary ammonium compound selected from the group consisting of soya dimethyl ethyl ammonium ethylsulfate, soya dimethyl ethyl ammonium ethylphosphate, and mixtures thereof and from about 0.4 to about 3 parts by weight of a plasticizer composition selected from the group consisting of N-ethyl-o- and p-toluene sulfonamide, o- and p-toluene sulfonamide, tetrakis (2 chloroethyl) ethylene diphosphate, and mixtures thereof, to provide a foam having a reduced tendency to develop and accumulate electrostatic charges.

2. The method of claim 1 where the antistatic additive composition is comprised of one part of quaternary ammonium compound to about one and one-half parts of plasticizer.

3. The method of claim 2 where the plasticizer is a liquid, and the quaternary ammonium compound is dissolved in the liquid plasticizer.

4. The method of claim 1 where the quaternary ammonium compound is soya dimethyl ethyl ammonium ethylsulfate.

5. The method of claim 4 where the plasticizer is a mixture of N-ethyl-o- and p-toluene sulfonamide.

6. The method of claim 1 where the polyol is selected from the group consisting of polyester polyol, polyether polyol, and mixtures thereof.

7. The method of claim 1 where the polyol is a blend of polyether polyol and a graft copolymer of polyether polyol and copolymerized styrene and acrylonitrile.

8. The method of claim 1 where the antistatic additive composition is prepared by mixing the quaternary ammonium compound and the plasticizer in the polyol.

9. Flexible polyurethane foam produced according to the method of any one of claims 1 through 8 inclusive.

* * * * *